(12) United States Patent
Buckmaster et al.

(10) Patent No.: US 6,298,320 B1
(45) Date of Patent: Oct. 2, 2001

(54) SYSTEM AND METHOD FOR TESTING AN EMBEDDED MICROPROCESSOR SYSTEM CONTAINING PHYSICAL AND/OR SIMULATED HARDWARE

(75) Inventors: Michael R. Buckmaster, Seattle; Arnold S. Berger, Redmond, both of WA (US)

(73) Assignee: Applied Microsystems Corporation, Redmond, WA (US)

( * ) Notice: Subject to any disclaimer, the term of this patent is extended or adjusted under 35 U.S.C. 154(b) by 0 days.

(21) Appl. No.: 09/024,324

(22) Filed: Feb. 17, 1998

(51) Int. Cl.$^7$ ........................................ G06F 9/455
(52) U.S. Cl. ............................... 703/28; 703/19; 703/20; 703/21; 703/22
(58) Field of Search ................. 395/500.44, 500.45, 395/500.49, 500.41, 500.42; 703/19–28; 716/4, 18

(56) References Cited

PUBLICATIONS

Borgatti et al, "A Smoothly Upgradable Approach to Virtual Emulation of HW/SW Systems", Proceedings of the Seventh IEEE International Workshop on Rapid System Prototyping, pp. 83–88, Jun. 1996.*

Manku et al, "Circuit Partitioning with Partial Order for Mixed Simulation Emulation Environment", Sixth IEEE International Workshop on Rapid System Prototyping, pp. 201–207, Jun. 1995.*

Bauer et al, "Hardware/Software Co–Simulation in a VHDL–based Test Bench Approach", IEEE Proceedings of the 34th Design Automation Conference, pp. 774–779, Jun. 1996.*

Berger, Co–Verification Handles More Complex Embedded Systems, Electronic Design, pp. 96–104, Sep. 1997.*

\* cited by examiner

Primary Examiner—Kevin J. Teska
Assistant Examiner—Samuel Broda
(74) Attorney, Agent, or Firm—Seed IP Law Group PLLC

(57) ABSTRACT

A system for testing an embedded system containing a target processor executing a target program and target hardware that may be partially physical and partially simulated. A target monitor determines when the target processor is attempting to access the simulated hardware. This determination is made by monitoring the address bus of the microprocessor to detect an address in the address space of the simulated hardware. An attempt to access the simulated hardware may also be detected by detecting the lack of an acknowledge signal from the physical hardware within a predetermined period after the target processor attempts to access the target hardware. In the event of an access to the simulated hardware, a bus capture circuit captures output signals on the bus connections of the target processor and converts the output signals to output data. The output data is then coupled through a communications interface to a hardware simulator. The hardware simulator processes the data in the same manner that the physical hardware would respond to signals corresponding to the output data. The hardware simulator may also generate data that are converted to corresponding input signals and applied to respective bus connections of the target processor by a bus driver circuit. During the time that output data is being processed by the hardware simulator, execution of the target program by the target processor is suspended, although the target processor may continue to service interrupts.

28 Claims, 3 Drawing Sheets

SYSTEM AND METHOD FOR TESTING AN EMBEDDED MICROPROCESSOR SYSTEM CONTAINING PHYSICAL AND/OR SIMULATED HARDWARE

TECHNICAL FIELD

The present invention relates generally to testing software and hardware in embedded systems, and, more specifically, to a system and method for testing software and hardware in embedded systems in which the hardware may be wholly or partially simulated.

BACKGROUND OF THE INVENTION

The use of computer simulation has become widespread in many areas, such as circuit design. The cost of manufacturing an integrated circuit is extremely high, and it is desirable that the hardware incorporated into the integrated circuit be tested prior to the actual fabrication of the integrated circuit. To that end, integrated circuit manufacturers often use simulators to test the hardware and the software intended to be executed by the hardware. The desired hardware design is known as the "target hardware," while the software intended to be executed by a "target processor" in the target hardware is known as the "target program."

There are several techniques that are used to test the target hardware before the target hardware has been fabricated. One approach is to simulate the hardware using a computer hardware simulator. The hardware simulator is a software program that simulates the responses of the target hardware and is implemented entirely in software. Thus, in the hardware simulator, the target hardware, including the target processor, is simulated entirely by computer software.

Another approach uses a target processor that interfaces with a hardware emulator of the target hardware. The hardware emulator is typically implemented using reconfigurable hardware, such as field-programmable gate arrays, that can be programmed to perform the functions of the target hardware. The target program is typically executed out of a memory device used with the hardware emulator. However, in some cases the target processor may be realized using a microprocessor in a microprocessor emulator, and, in such cases, the target processor may execute the target program from memory in the microprocessor emulator. Thus, in the hardware emulator approach, the target hardware, including the target processor, is implemented entirely in hardware, although the target processor interfaces with emulated target hardware instead of the actual target hardware.

More recently, a system has been developed for testing embedded systems in which a hardware simulator is coupled to a microprocessor emulator. This system is described in U.S. patent application Ser. No. 08/566,401 by Geoffrey J Bunza, which is incorporated herein by reference. A communications interface controls communication between a memory, a microprocessor in the emulator, and the hardware simulator. The microprocessor receives target instructions from the memory and then executes the target instructions. When the microprocessor requires interaction with the target hardware, the emulator communicates with the hardware simulator so that the simulated target hardware interacts with the microprocessor. The advantages of the Bunza approach are that it is not necessary for the hardware simulator to simulate the microprocessor, thereby greatly decreasing the hardware simulation task. Further, the target code is executed at essentially normal speed until an interaction with the target hardware occurs.

Each of the above-described approaches has advantages and disadvantages. The hardware simulator is extremely slow and cumbersome, particularly when used to simulate a complex microprocessor executing a target program. Thus, testing a complete target program is impractical due to the extremely long execution times required by the typical hardware simulator. The use of an actual target processor interfacing with a hardware emulator allows a target program to be executed much faster than the hardware simulator, but it can require extensive programming of the hardware emulator to perform the functions of the target hardware. The Bunza approach solves many of the above-described problems, but it can be used only with simulated target hardware. It cannot be used to test target software and hardware where the hardware is, in whole or in part, physically present in the target system. Thus, the target system can be tested before fabrication of the target hardware has started using the Bunza approach or after fabrication of the target hardware has been completed using a conventional emulator. However, there is no satisfactory technique for allowing target software and hardware to be tested during hardware fabrication while the target hardware is only partially fabricated.

With the advent of 32-bit microprocessors and complex operating software, embedded systems have become very complex. The vast majority of electronic products built today include some form of computer hardware executing a stored software program. An embedded system may typically include a "target processor" executing instructions in a "target program" and interacting with "target hardware" which may be an application specific integrated circuit (ASIC) or a custom integrated circuit (IC).

Given the complexity and density of modem electronics designs, it is desirable that the first system prototype, including the target hardware and the target program, be close in form, fit, and function to the end product. The target hardware prototypes would therefore ideally include the final ASIC and custom IC designs. However, for the reasons explained below, it is usually not practical to prototype embedded systems in this manner.

When software engineers start work, the target hardware which will ultimately execute the target program does not exist in physical form. As explained above, various approaches have been developed to allow testing of target software as it interacts with target hardware before the target hardware has been physically realized. However, as also explained above, none of these approaches are entirely satisfactory. As a result, the physical target hardware and the target software of a target system are typically brought together for the first time when the prototype target hardware has been fabricated. Because of the prior unavailability of the physical target hardware, one often finds that the target program loaded at the time of the integration of the prototype target hardware and software does not work. It is common to find that the integration problems are strictly due to software complications alone. This may cause a significant delay in the software development due to the problems in the target program. Other problems with the integration may be caused by the interaction of the target hardware with the target program. Consequently, considering the large cost of ASIC and custom IC design, and the relatively low cost ease of software modification, it is common that the software will be force-fitted to the target hardware prototype, thereby increasing the overall planned software development time.

There is therefore a need for a system that allows a target program and target hardware for an embedded to be tested throughout the design and fabrication of the target hardware, including at the time that only a portion of the target hardware has been fabricated and is physically present in the embedded system.

SUMMARY OF THE INVENTION

The present invention is embodied in a system and method for testing embedded electronic systems that include a target processor, a memory containing a target program executed by the target processor, and target hardware, part of which may be physically present and coupled to the target processor. The testing system includes a target monitor coupled to the target processor, and a communications interface coupling the target monitor to a hardware simulator that is configured to simulate the portion of the target hardware that is not yet physically present in the embedded system. The target monitor determines when the target processor is attempting to access the simulated portion of the target hardware or the simulated portion of the target hardware is attempting to access the target processor. Upon detecting an access to the simulated target hardware, the target monitor causes the target processor to suspend execution of the target program. The target monitor then converts output signals from the target processor that are directed to the simulated hardware to corresponding output data. The output data is transferred through the communications interface to the hardware simulator where the data is processed in the same manner that the corresponding signals from the target processor would be processed by the target hardware if it were physically present in the embedded system. When the simulated target hardware attempts to access the target processor or respond to an access by the target processor, the hardware simulator generates input data corresponding to signals that would be generated by the target hardware if physically present in the embedded system. The input data are coupled through the communications interface to the target monitor where they are converted to signals that are applied to the target processor. The signals are the same as the signals that would be generated by the target hardware if it was physically present in the embedded system. The target processor accesses target hardware that is physically present in the embedded system in the same manner that it would in the embedded system after all of the target hardware has been fabricated.

The target monitor preferably detects an access to the simulated physical hardware in either of two modes. In the first mode, the target monitor detects that the target processor has issued an address that is in the address space of the simulated target hardware. In the second mode, the target monitor detects a failure of target hardware to return an acknowledgment signal within a predetermined time in response to an access, as is normally done in response to an access by the target processor. An access to an address in the address space of the simulated target hardware is preferably detected using a mapping memory, and an address comparator. The mapping memory records addresses in the address space of the simulated target hardware, and the address comparator compares each address on the address bus of the target processor to addresses recorded in the mapping memory. In the event of a match, the target monitor suspends execution of the target program and causes the access to be processed by the hardware simulator as described above. The lack of an acknowledgment signal is preferably detected by a control signal monitor and a timer. The control signal monitor monitors a terminal on the target processor that is adapted to receive the acknowledgment signal from the physical target hardware in the event of an access to the physical target hardware by the target processor. The control signal monitor generates a detect signal in response to receiving the acknowledgment signal. The timer initiates a timing period responsive to an access by the target processor to the target hardware. Unless the detect signal has been received within a predetermined period after initiating the timing period, the timer suspends execution of the target program and causes the access to be processed by the hardware simulator as described above.

DETAILED DESCRIPTION OF THE INVENTION

Figure 1:
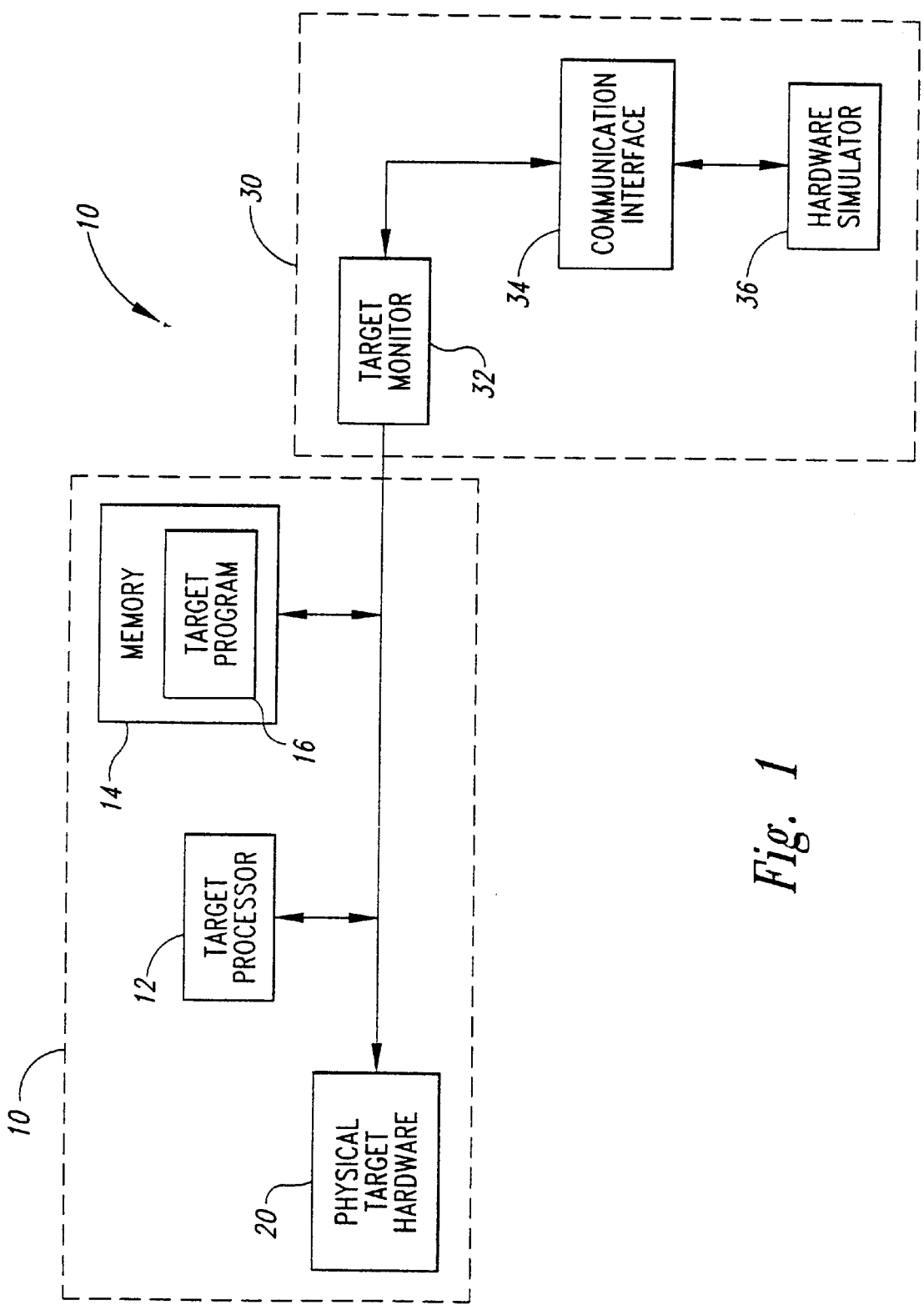
FIG. 1 is a block diagram of one embodiment of a system and method for testing an embedded system containing a target processor and physical and/or simulated hardware in accordance with one embodiment of the invention.

One embodiment of a system for testing embedded electronic systems is illustrated in FIG. 1. An embedded system 10 includes a target processor 12 coupled to a memory 14 that contains at least a target program 16 for execution by the target processor 12. The memory 14 may also include other program instructions and/or data for use by the target processor 12. The memory 14 may be read only memory ("ROM"), random access memory ("RAM"), or a combination of ROM and RAM.

Also coupled to the target processor 12 in the embedded system 10 is physical target hardware 20, which consists of the target hardware that has already been implemented. The remaining portion of the target hardware that is not included in the physical target hardware 20 is simulated, as explained below.

A system 30 for testing the embedded system 10 includes a target monitor 32, a communications interface 34, and a hardware simulator 36 that is coupled to the target monitor 32 through the communications interface 34. The hardware simulator 36 is a conventional device that simulates the portion of the target hardware that is not included in the physical target hardware 20. For example, the hardware simulator may be implemented by a host computer executing a properly configured hardware simulation program.

In operation, the target processor 12 executes the target program 16 thereby causing the target processor 12 to access both the physical target hardware 20 and simulated target hardware. The target processor 12 accesses the physical target hardware 20 in the normal manner, since the physical target hardware 20 is actually present in the embedded system 10. However, the target processor 12 cannot access the simulated portion of the target hardware in the normal manner since the simulated target hardware has not yet been implemented.

When the target processor 12 attempts to access target hardware other than the physical target hardware 20, the target processor 12 instead accesses the testing system 30. More specifically, the target monitor 32 monitors appropriate terminals on the target processor 12, as explained below, to determine when the target processor 12 is attempting to access target hardware that is not included in the physical target hardware 20. The target monitor 32 then converts to output signals from the target processor 12 to corresponding output data. The output data is coupled through the communications interface 34 to the hardware simulator 36. The hardware simulator 36 then processes the output data in the same manner that target hardware, if physically present in the embedded system 10, would process the output signals from the target processor 12. In some cases, the target hardware is adapted to respond to the output signals from the target processor 12 by returning signals to the target processor 12. In other cases, the target hardware may initiate an interaction with the target processor 12. In either case, the hardware simulator 36 generates input data that is coupled through the communications interface 34 to the target monitor 32. The target monitor 32 then converts the input data to corresponding input signals that are applied to appropriate terminals of the target processor 12. The input signals are identical to the input signals that would be applied to the target processor 12 if the simulated target hardware was instead physically present in the embedded system 10.

During the time that the target processor 12 is accessing the simulated target hardware as explained above, the target monitor 32 applies appropriate control signals to the target processor 12 to suspend execution of the target program 16. Thus, execution of the target program 16 proceeds in the same order that the target programs 16 would be executed if the simulated target hardware was instead a part of the physical target hardware 20. During the time that the target processor 12 has suspended execution of the target program 16, the target processor may service interrupts with various interrupt routines. This is accomplished by holding the target processor 12 in an extended wait state and suspending execution of the target program. In particular, the bus cycle is terminated and there is an immediate vector to an exception handler that the customer links into the target program. The exception handler essentially sits in a poling loop waiting for the hardware simulator 36 to complete processing of an access to simulated target hardware. During this poling loop, any other exceptions that need to be serviced by the target processor 12 can be. When the hardware simulator 36 responds, the poling loop is exited, the bus cycle that caused the access to the simulated target hardware is recreated, and the exception handler is exited. This process is typically performed only for a read access to the simulated target hardware 36 because a write access does not depend on receiving data from the simulated target hardware to properly complete the bus cycle. Thus, the target processor 12 may be somewhat multitasking.

Although the target processor 12 and memory 14 are shown in FIG. 1 as it being stand-alone components, it will be understood that they may instead be part of a conventional emulator (not shown) that is plugged into an embedded system 10 containing the physical target hardware 20.

A variety of techniques may be used by the target monitor 32 to determine when the target processor 12 is attempting to access target hardware that is not a part of the physical target hardware 20. For example, the target monitor 32 may record the addresses that are in the address space of the simulated target hardware. The target monitor 32 may then monitor the address bus of the target processor 12. In the event the target processor 12 outputs an address that is in the address space of the simulated hardware, the target monitor 32 captures the signals on the data and control buses of the target processor 12 and applies one or more control signals to the target processor 12 to suspend execution of the target program 16 until the access to the simulated hardware has been completed. Alternatively, in the event the simulated hardware is adapted to respond to an access with an acknowledge or other signal, the target monitor 32 may monitor the signal line on which the acknowledge or other signal is coupled to the target processor 12. In the event the acknowledge or other signal is not applied to the target processor 12 within a pre-determined time, the target monitor 32 can treat the access as an access to simulated target hardware since there is apparently no physical target hardware 20 in the embedded system 10 to return the acknowledge or other signal.

Figure 2:
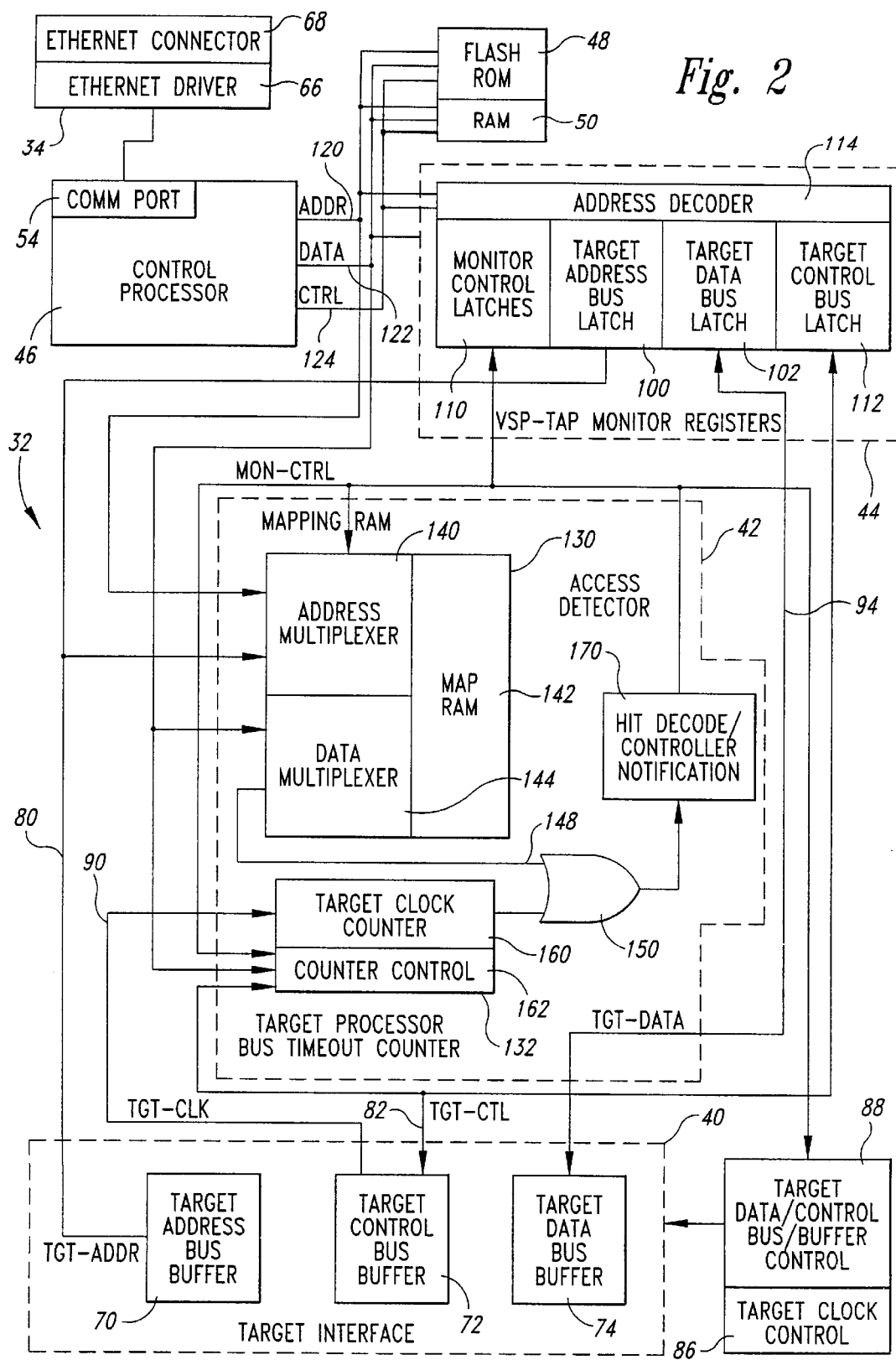
FIG. 2 is a detailed block diagram of one embodiment of the testing system of FIG. 1.

Embodiments of the target monitor 32 and the communications interface used in the testing system 30 of FIG. 1 are illustrated in greater detail in FIG. 2. The target monitor 32 includes: (a) a target interface circuit 40 that is coupled to the address, control and data buses of the target processor 12 (FIG. 1); (b) an access detector 42 for detecting when the target processor 12 is attempting to access simulated target hardware; (c) a bus capture and driver circuit 44 that captures signals from the target processor 12 and generates signals that are applied to the target processor 12; (d) a control processor 46 for controlling the operation of the target monitor 32; (e) a ROM 48 containing a program that is executed by the processor 46; and (f) a RAM 50 used by the processor 46 to store data. The processor 46 also includes a communications port 54 that is coupled to the communications interface 34. The communications interface 34 includes a conventional Ethernet driver 66 and an Ethernet connector 68 that mates with a conventional Ethernet connector (not shown) of the hardware simulator 36 (FIG. 1).

The target interface circuit 40 includes a target address bus buffer 70, a target control bus buffer 72 and a target data bus buffer 74. The target address bus buffer 70 receives address signals from the address bus of the target processor 12 and couples the signals to an internal address bus 80. Similarly, the target data bus buffer 74 coupled data signals between the data bus of the target processor 12 and an internal data bus 94. The target control bus buffer 72 couples at least some control signals between the control bus of the target processor 12 and an internal control bus 82. One of the control signals coupled from the target processor 12 to internal control bus 82 is a target clock signal that is coupled to a target clock line 90.

The system 30 also includes a target clock control circuit 86 that also receives the target clock signal and applies it to a target data/control bus buffer control circuit 88. The target data/control bus buffer control circuit 88 selectively enables the target control bus buffer 72 and the target data bus buffer 74 in synchronism with the target clock signal to capture control and data signals from the target processor 12 and apply control and data signals to the target processor 12 at the proper time.

In some cases, the target clock control circuit 86 and the target data/control bus buffer control circuit 88 may be integrated into the embedded system 10 for test purposes. It is then possible to devise the target clock control circuit 86 so that it can decouple the target clock signal from the target processor 12. When the target clock signal is decoupled from the target processor 12, the target processor 12 suspends execution of the target program 16. The target clock control circuit thus provides one means of causing the target processor 12 to suspend execution of the target program 16 when the hardware simulator 36 is processing an access to the simulated target hardware.

The internal address bus 80 is coupled to the access detector 42 and to a target address bus latch 100 in the bus capture and driver circuit 44. As explained in greater detail below, the target address bus latch 100 captures address signals from the target address bus buffer 70 and couples those address signals to the control processor 46. As also explained in greater detail below, the access detector 42 examines the address signals on the internal address plus 80 to determine if the target processor 12 is attempting to access simulated target hardware.

The internal control bus 82 and the target clock line 90 are coupled to the access detector 42, although the internal control bus 82 is also coupled to a target control bus latch 112 in the bus capture and driver circuit 44. As explained below, the access detector 42 examines certain control signals on the internal control bus 82 over a pre-determined number of cycles of the target clock signal to determine when physical target hardware 20 is not present in the embedded system 10 to return an acknowledge signal in response to an attempted access to target hardware. In this manner, the access detector 42 determines that the attentive access to target hardware is an access to simulated target hardware. The target control bus latch 112 is used to capture signals on the terminals of the target processor, such as a R/W* signal to specify whether an access to the simulated target hardware is a read or a write access. The target control bus latch 112 is also used to output one or more control signals that are applied to terminals of the target processor 12, such as a control signal to suspend execution of the target program 16 (FIG. 1). For example, during the period that the hardware simulator 36 is processing an access to the simulated target hardware, the target control bus latch 112 can output an inactive READY signal to an Intel® processor or an inactive data strobe acknowledge DSACK signal to an Motorola® processor used at the target processor 12.

The internal data bus 94 is coupled to a target data bus latch 102 in the bus capture and driver circuit 44. The target data bus latch 102 outputs data signals to the internal data bus 94 and stores data bus signals from the internal data bus 94.

In addition to be target address bus latch 100 and the target data bus latch 102, the bus capture and driver circuit 44 includes a monitor control latch 110 and an address decoder 114. The address decoder 114 decodes addresses from the control processor 46 corresponding to each of the latches 100–112. The control processor stores signals or receives signals from a specific one of the latches 100–112 by outputting an address corresponding to the specific latch. At the same time, the control processor 46 applies the signals to be stored in the latch 100–112 being accessed or receives signals from the latch 100–112 being accessed via a data bus 122. The control processor 46 also applies appropriate control signals to the address decoder via a control bus 124.

In operation, the monitor control latch 110 receive signals from the control processor 46 that are used to control the operation of the latches 100, 102, and 112. As explained in greater detail below, when the access detector 42 determines that the target processor 12 is attempting to access simulated target hardware, it applies a signal to the monitor control latch 110. The monitor control latch 110 then causes the other latches 100, 102, and 112 to capture the address, control and data signals, respectively, from the target processor 12. The monitor control latch 110 also applies control signals to the buffer control circuit 88 and control signals to the access detector 42.

The access detector 42 includes a mapping RAM 130 and a timeout circuit 132. As explained in greater detail below, the mapping RAM 130 detects an access to simulated target hardware by detecting an address from the target processor 12 that is in the address space of the simulated target hardware. The timeout circuit 132 detects an access to simulated target hardware by determining that there is no target hardware in the embedded system 10 that has responded to an access to target hardware with an acknowledgment signal within a pre-determined time.

The mapping RAM 130 includes an address multiplexer 140 that couples either the address bus 120 of the control processor 46 or the internal address bus 80 to a map RAM 142. Thus, the address multiplexer 140 allows the map RAM 130 to be accessed by either the control processor 46 through its address bus 120 or the target processor 12 through its address bus (not shown), the target address bus buffer 70, and the internal address bus 80. The mapping RAM 142 and either the data bus 122 of the control processor 46 or a data line 148 that is applied to one input of an OR gate 150. The address multiplexer 140 and the data multiplexer 142 are controlled by the control processor 46, which stores appropriate control signals in the monitor control latch 110 that are applied to the address multiplexer 140 and the data multiplexer 142.

In operation, the map RAM 142 is initially programmed the address multiplexer 140 coupling the address bus 120 of the control processor 46 and the data multiplexer 144 coupling the data bus 122 of the control processor 46 to the map RAM 142. The control processor 46 then stores a bit at each address in the address space of the target processor 12. The stored bit at each address is a logic "0" if that address is in the address space of the physical target hardware 20 while the stored bit at each address is a logic "1" if the address is in the address space of the simulated target hardware. After the map RAM 142 has been programmed, the address multiplexer 140 couples the internal address bus 80 to the map RAM 142 and the data bit from the map RAM 142 to the OR gate 150. As the target processor 12 executes the target program 16, the addresses output by the target processor 12 are coupled through the target address bus buffer 70, the internal address bus 80, and the address multiplexer 140 to the map RAM 142. Each address from the target processor 46 thus accesses the map RAM 142, thereby causing the map RAM 142 to output a data bit stored at that address. The data bit is either a logic "0" specifying that the address is in the address space of the physical target hardware 20 or a logic "1" specifying that the address is in the address space of the simulated target hardware. If the address output by the target processor 12 is in the address space of the simulated target hardware, the OR gate 150 outputs a logic "1".

The timeout counter 132 includes a target clock counter 160 and a counter control circuit 162. The target clock counter 160 increments to a terminal count from an initial count that is pre-loaded by the counter control circuit 162. The counter control circuit 162 also selectively enables the target clock counter 160. When the target clock counter 160 reaches the terminal count, it outputs a logic "1" thereby causing the OR gate 150 to output a logic "1". The counter control circuit 162 stores the initial count responsive to the monitor control latch 110 outputting an appropriate control signal. The counter control circuit 162 then stores the initial count from the data bus 122 of the control processor 46. The counter control circuit 162 then pre-loads the initial count into the target clock counter 160, and the target clock counter 160 increments responsive to the target clock signal from the target bus control buffer 72. However, the counter control circuit 162 allows the target clock counter 160 to increment only after the monitor control latch 110 has applied an appropriate control signal to the counter control circuit 162 signifying that the target processor 12 has attempted to access the target hardware (either physical 20 or simulated). If the target processor 12 is accessing the physical target hardware 20, the physical target hardware 20 will return an acknowledge signal that is applied to the counter control circuit 162 from the target control bus buffer 72. The acknowledge signal causes the counter control circuit 162 to disable the target clock counter 160 so that the target clock counter 160 never reaches the terminal count. Thus, the target clock counter 160 never outputs a logic "1". If, however, there is no physical target hardware at the address being accessed by the target hardware 12, no physical target hardware will return an acknowledge signal. As a result, the target clock counter 160 will increment to the terminal count, thereby causing the target clock counter to output a logic "1". The OR gate 150 will then output a logic "1." Therefore, the OR gate 150 will output a logic "1" whenever the mapping RAM 130 or the timeout counter 132 detects that the target processor 12 is attempting to access simulated target hardware.

The output of the OR gate 150 is applied to a decode/controller notification circuit 170 that, in turn, applies an appropriate control signal to the monitor control latch 110. The monitor control latch 110 then causes the bus latches 100, 102, and 112 to capture address, data, and control signals from the target processor 12. The address, data, and control signals are then coupled from the latches 100, 102, and 112 to the control processor 46, which converts the signals to corresponding output data. The output data is coupled through the communications interface 34 to the hardware simulator 36, which processes the data in a manner corresponding to the manner that physical target hardware would process the address, data, and control signals from the control processor if the physical target hardware was actually present in the embedded system 10.

In the event the simulated target hardware returns an acknowledge signal in response to an access, or in the event an interaction between the simulated target hardware and the target processor 12 is initiated by the simulated target hardware, the hardware simulator 36 send input data to the control processor 46 through the communications interface 34. The hardware simulator 36 then converters the input data to corresponding data and control signals, and stores these signals in the data and control bus latches 102 and 112, respectively. Finally, the latches, 102 and 112 apply these signals to the target processor 12 through the target data and control bus buffers 74 and 72, respectively. The target processor 12 thus receives the same signals that it would receive if the simulated target hardware was physically present in the embedded system 10.

If an interaction between the target processor 12 and the simulated target hardware is initiated by the target processor 12, the interaction is detected by the access detector 42, as explained above. However, if an interaction between the target processor 12 and the simulated target hardware is initiated by the simulated target hardware, the access detector 42 will be unable to detect the interaction because the access detector 42 can only detect accesses initiated by the target processor 12. As is customary in embedded system design, an interaction between the target hardware and the target processor is initiated by the target hardware applying an interrupt signal to the target processor. The target processor then executes an interrupt routine that is part of the target program.

In the event an interaction between the simulated target hardware and the target processor is initiated by the simulated target hardware, the hardware simulator 36 will send input data to the control processor 36 that is indicative of an interrupt. The control processor 46 will then convert the input data to an interrupt signal, and store the interrupt signal in the target control bus latch 112. The target control bus latch 112 applied the interrupt signal to the interrupt terminal of the target processor 12 through the target control bus buffer 72. The target processor 12 then executes an interrupt routine that is stored in the flash ROM 48 as part of the target program 16. The target processor 12 executes the interrupt routine in the same manner that it would had the physical target hardware 20 generated the interrupt signal instead of the simulated target hardware. Thus, the target processor 12 response to an interaction initiated by the target hardware in the same manner regardless of whether the target hardware is physical target hardware 20 or simulated target hardware.

Figure 3:
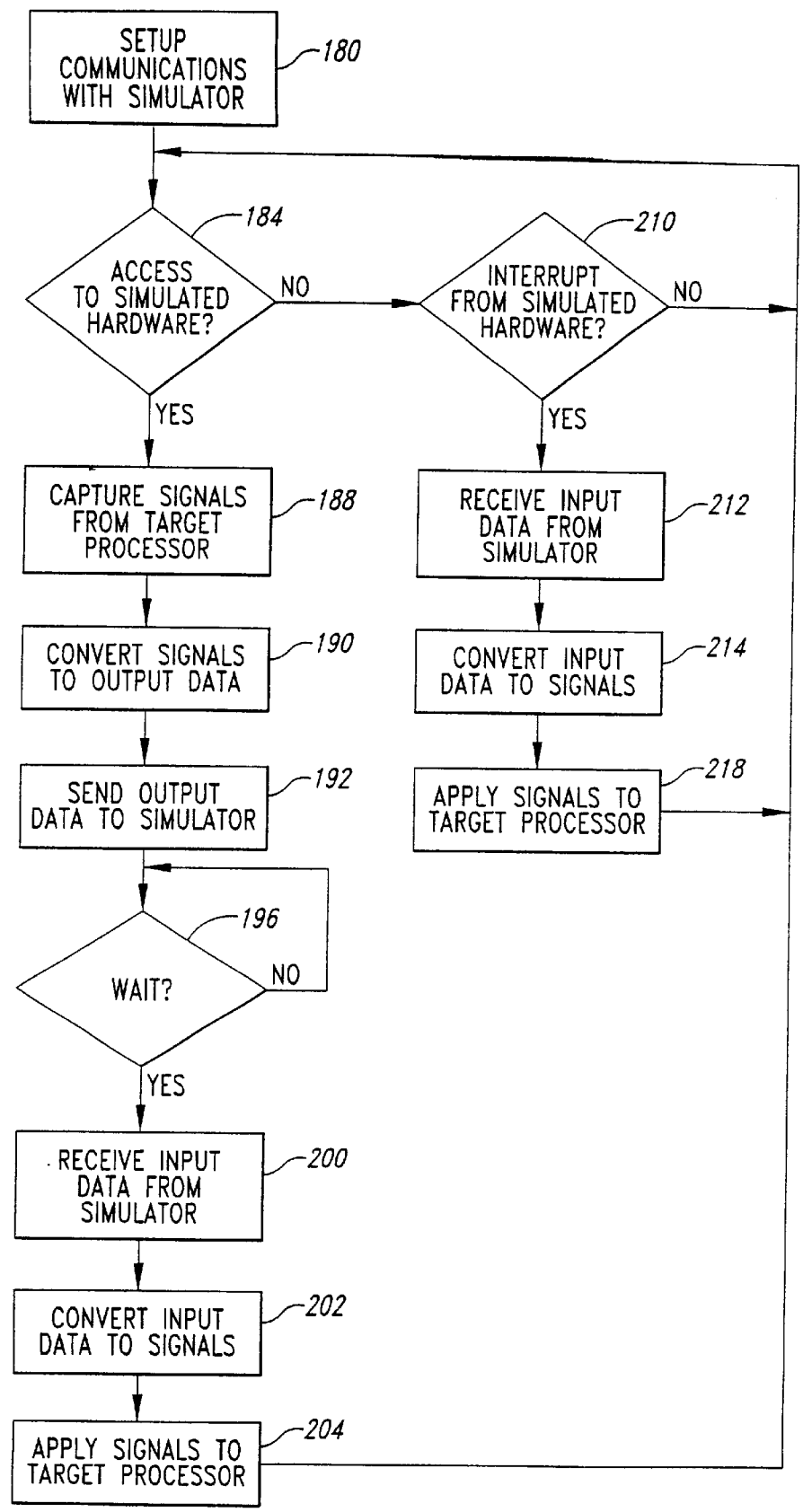
FIG. 3 is a flow chart of software that is executed by a control processor in the testing system of FIG. 2 to perform a method in accordance with one embodiment of the invention.

FIG. 3 is a flow chart of the software stored in the flash ROM 48 that is executed by the control processor 46. The program is entered at 180 in which the control processor 46 sets up communications with the hardware simulator 36. The program executed by the control processor 46 then proceeds to step 184 where it causes the control processor 46 to examine the output of the hit decode/controller notification circuit 170 coupled through the monitor control latch 110. As explained above, if the target processor 12 outputs an address in the address space of the simulated target hardware or the physical target hardware 20 fails to return an acknowledge signal within a pre-determined time, the hit decode/controller notification circuit 170 will output a signal indicative of an access to simulated target hardware. In such case, the program branches from 184 to step 188 in which the signals on the buses of the target processor 12 are captured, as explained above. Upon receiving the captured signals from the target processor 12, the control processor 46 converts the signals to corresponding output data at step 190. The control processor 46 then sends the data to the hardware simulator 36 (FIG. 1) at step 192.

As explained above, the hardware simulator 36 then processes the data in the same manner that the actual signals output by the target processor 12 would be processed by physical target hardware that is being stimulated in the hardware simulator 36. During the time that the data is being processed by the hardware simulator 36, the program remains in a loop at step 196. When the hardware simulator 36 has completed processing the output data, it sends input data to the control processor 46 at step 200. The control processor 46 then formats the input data into corresponding signals, such as an acknowledge signal, at step 202, and the signals are sent to the target processor 12 at step 204. The program then returns to step 184 to await another access to the simulated target hardware by the target processor 12.

The above description explains the operation of the control processor 46 when an interaction between the target processor 12 and the simulated target hardware is initiated by the target processor 12. However, as explained above, in an embedded system, the interaction between the target processor 12 and the target hardware may be initiated by the target hardware. Accordingly, if the control processor 46 does not detect that the target processor 12 is attempting to access simulated target hardware, the program executed by the control processor 46 branches to step 210. At step 210, the control processor 46 detects input data from the target hardware simulator 36 corresponding to an interrupt signal. The interrupt signal is the same signal that the target hardware being simulated, if physically present in the embedded system 10, would apply to the target processor 12. In the event input data from the target hardware simulator 36 corresponding to an interrupt is detected at 210, the input data are applied to the control processor 46 at step 212. The input data may correspond to signals that would be applied to the target processor 12 by the target hardware, if physically present in the embedded system 10 in addition to an interrupt signal. In either case, the control processor 46 formats the data into corresponding signals at step 214. Finally, the signals are sent through the bus capture and driver circuit 44 to the target processor 12 at step 218.

It is thus seen that the testing system 30 is able to analyze and test an embedded system even though only a portion of the target hardware has been fabricated and is physically present in the embedded system. As a result, the interaction between the target software and the target hardware can be tested before all of the target hardware has been physically realized, and the target hardware can be tested as it is developed and physically placed in the embedded system. From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A system for testing an embedded electronic systems having a target processor executing a target program and coupled to target hardware, the target hardware consisting of one of physical target hardware, simulated target hardware, and combinations thereof, the system comprising:

a hardware simulator configured to simulate the simulated target hardware;

a target monitor coupled to the target processor, the target monitor being operative to determine when the target processor is attempting to communicate with the simulated target hardware and to suspend execution of the target program in response thereto, the target monitor further being operative to convert output signals from the target processor that are directed to the simulated target hardware to corresponding output data and to convert input data from the hardware simulator to corresponding input signals that are applied to the target processor; and a communications interface coupling the target monitor to the hardware simulator, the communications interface being operative to transfer the output data from the target monitor to the hardware simulator and being operative to transfer the input data from the hardware simulator to the target monitor.

2. The system of claim 1 further comprising a microprocessor emulator containing the target processor and a memory device containing the target program.

3. The system of claim 1 wherein the simulated target hardware has an address space with corresponding addresses and the target monitor comprises:

a mapping memory recording addresses of the address space of the simulated target hardware; and an address comparator coupled to the mapping memory and an address bus of the target processor, the address comparator comparing an address on the address bus to addresses recorded in the mapping memory and suspending execution of the target program in response to a match between the address on the address bus and one of the addresses recorded in the mapping memory.

4. The system of claim 1 wherein the target monitor comprises:

a control signal monitor monitoring a terminal on the target processor that is adapted to receive a control signal from the physical target hardware in the event of an access to the physical target hardware by the target processor, the control signal monitor generating a detect signal in response to receiving the control signal; and a timer coupled to the target processor and the control signal monitor, the timer initiating a timing period responsive to an access by the target processor to the target hardware and suspending execution of the target program after the timing period has been initiated unless the detect signal has been received within a predetermined period after initiating the timing period.

5. The system of claim 4 wherein the control signal comprises an acknowledge signal adapted to be generated by the physical target hardware responsive to an access by the target processor to the physical target hardware.

6. The system of claim 1 wherein the target monitor comprises:

a control processor to control operation of the target monitor;

a target processor bus driver circuit operative to receive the input signals from the control processor and to apply the input signals to the target processor; and a target processor bus capture circuit operative to apply the output signals from the target processor to the control processor.

7. The system of claim 1 wherein the communication interface comprises Ethernet link coupling the target monitor to the hardware simulator.

8. The system of claim 1 wherein the hardware simulator comprises a host computer programmed with a hardware simulation program that simulates the simulated target hardware.

9. The system of claim 8 further comprising a microprocessor emulator containing the target processor and a memory device containing the target program, the microprocessor emulator being coupled to the host computer to serve as a user interface for the emulator.

10. A system for testing an embedded electronic systems having a target processor adapted to execute a target program, the target processor being coupled to target hardware, the target hardware consisting of one of physical target hardware, simulated target hardware having an address space with corresponding addresses, and combinations thereof, the system comprising:

a hardware simulator configured to simulate the simulated target hardware;

a mapping memory recording addresses of the address space of the simulated target hardware;

an address comparator coupled to the mapping memory and an address bus of the target processor, the address comparator comparing an address on the address bus to addresses recorded in the mapping memory and suspending execution of the target program in response to a match between the address on the address bus and one of the addresses recorded in the mapping memory;

a target processor bus capture circuit operative to store output signals from the target processor responsive to the address comparator detecting a match between the address on the address bus and one of the addresses recorded in the mapping memory;

a signal converter converting the output signals stored in the bus capture circuit to corresponding output data; and a communications interface coupling the signal converter to the hardware simulator, the communications interface transferring the output data from the signal converter to the hardware simulator.

11. The system of claim 10 further comprising:
a second signal converter coupled to the hardware simulator, the second signal converter converting input data from the hardware simulator to corresponding input signals; and
a target processor bus driver circuit coupled to the second signal converter, the target processor bus driver circuit being operative to apply the input signals to the target processor.

12. The system of claim 10 further comprising a microprocessor emulator containing the target processor and a memory device containing the target program.

13. The system of claim 10 wherein the communications interface comprises an Ethernet link coupling the signal converter to the hardware simulator.

14. The system of claim 10 wherein the hardware simulator comprises a host computer programmed with a hardware simulation program that simulates the simulated target hardware.

15. The system of claim 14 further comprising a microprocessor emulator containing the target processor and a memory device containing the target program, the microprocessor emulator being coupled to the host computer to serve as a user interface for the emulator.

16. A system for testing an embedded electronic systems having a target processor adapted to execute a target program, the target processor being coupled to target hardware, the target hardware consisting of one of physical target hardware, simulated target hardware, and combinations thereof, the system comprising:
a hardware simulator configured to simulate the simulated target hardware;
a control signal monitor monitoring a terminal on the target processor that is adapted to receive a control signal from the physical target hardware in the event of an access to the physical target hardware by the target processor, the control signal monitor generating a detect signal in response to receiving the control signal;
a timer coupled to the target processor and the control signal monitor, the timer initiating a timing period responsive to a target hardware access by the target processor and suspending execution of the target program after the timing period has been initiated unless the detect signal has been received within a predetermined period after initiating the timing period;
a target processor bus capture circuit operative to store output signals from the target processor after the timing period has been initiated unless the detect signal has been received within a predetermined period after initiating the timing period;
a signal converter converting the output signals stored in the bus capture circuit to corresponding output data; and
a communications interface coupling the signal converter to the hardware simulator, the communications interface transferring the output data from the signal converter to the hardware simulator.

17. The system of claim 16 further comprising:
a second signal converter coupled to the hardware simulator, the second signal converter converting input data from the hardware simulator to corresponding input signals; and
a target processor bus driver circuit coupled to the second signal converter, the target processor bus driver circuit being operative to apply the input signals to the target processor.

18. The system of claim 16 further comprising a microprocessor emulator containing the target processor and a memory device containing the target program.

19. The system of claim 16 wherein the communications interface comprises an Ethernet link coupling the signal converter to the hardware simulator.

20. The system of claim 16 wherein the hardware simulator comprises a host computer programmed with a hardware simulation program that simulates the simulated portion of the target hardware.

21. The system of claim 20 further comprising a microprocessor emulator containing the target processor and a memory device containing the target program, the microprocessor emulator being coupled to the host computer to serve as a user interface for the emulator.

22. A system for testing an embedded electronic systems having a target processor executing a target program and coupled to target hardware, the target hardware consisting of one of physical target hardware, simulated target hardware, and combinations thereof, the system comprising:
a hardware simulator configured to simulate the simulated target hardware;
a target monitor coupled to the target processor, the target monitor comprising:
a control signal monitor monitoring a terminal on the target processor that is adapted to receive a control signal from the physical target hardware in the event of an access to the physical target hardware by the target processor, the control signal monitor generating a detect signal in response to receiving the control signal; and
a timer coupled to the target processor and the control signal monitor, the timer initiating a timing period responsive to an access by the target processor to the target hardware and suspending execution of the target program after the timing period has been initiated unless the detect signal has been received within a predetermined period after initiating the timing period, the target monitor further being operative to convert output signals from the target processor that are directed to the simulated target hardware to corresponding output data; and
a communications interface coupling the target monitor to the hardware simulator, the communications interface being operative to transfer the output data from the target monitor to the hardware simulator.

23. The system of claim 22 wherein the control signal comprises an acknowledge signal adopted to be generated by the physical target hardware responsive to an access by the target processor to the physical target hardware.

24. The system of claim 22 further comprising a microprocessor emulator containing the target processor and a memory device containing the target program.

25. The system of claim 22 wherein the communications interface comprises an Ethernet link coupling the target monitor to the hardware simulator.

26. The system of claim 22 wherein the hardware simulator comprises a host computer programmed with a hardware simulation program that simulates the simulated target hardware.

27. The system of claim 26 further comprising a microprocessor emulator containing the target processor and a memory device containing the target program, the microprocessor emulator being coupled to the host computer to serve as a user interface for the emulator.

28. A system for testing an embedded electronic systems having a target processor executing a target program and coupled to target hardware, the target hardware consisting of one of physical target hardware, simulated target hardware having an address space with corresponding addresses, and combinations thereof, the system comprising:

a hardware simulator configured to simulate the simulated target hardware;

a target monitor coupled to the target processor, the target monitor comprising:

a mapping memory recording addresses of the address space of the simulated target hardware; and an address comparator coupled to the mapping memory and an address bus of the target processor, the address comparator comparing an address on the address bus to addresses recorded in the mapping memory and suspending execution of the target program in response to a match between the address on the address bus and one of the addresses recorded in the mapping memory, the target monitor further being operative to convert output signals from the target processor that are directed to the simulated target hardware to corresponding output data; and a communications interface coupling the target monitor to the hardware simulator, the communications interface being operative to transfer the output data from the target monitor to the hardware simulator.

\* \* \* \* \*